United States Patent [19]

McLaughlin et al.

[11] 4,381,526
[45] Apr. 26, 1983

[54] VELOCITY CONTROL SYSTEM FOR A DATA STORAGE APPARATUS

[75] Inventors: David G. McLaughlin, San Jose; Andrew M. Rose, Mountain View, both of Calif.

[73] Assignee: Memorex Corporation, Santa Clara, Calif.

[21] Appl. No.: 205,679

[22] Filed: Nov. 10, 1980

[51] Int. Cl.³ .............................................. G11B 21/10
[52] U.S. Cl. .................................... 360/78; 360/77
[58] Field of Search ............................. 360/77, 78, 98

[56] References Cited

U.S. PATENT DOCUMENTS 4,006,394 2/1977 Cuda et al. ............................. 360/78
4,217,612 8/1980 Matla et al. ......................... 360/77 X
4,257,074 3/1981 Goss ..................................... 360/78

OTHER PUBLICATIONS

"Access Control Trajectory" by Oswald, IEEE Transactions on Magnetics, Jul. 1978, vol. MAG 14, No. 4, p. 177.

*Primary Examiner*—John H. Wolff
*Attorney, Agent, or Firm*—Limbach, Limbach & Sutton

[57] ABSTRACT

An access control system for controlling the velocity of a head assembly in a disc drive has a digital difference counter, to note the number of tracks to be traversed, a ROM to output two values of velocity: One value corresponding to the present remaining number of tracks and another value corresponding to the remaining number of tracks minus one. An intergrator generates a signal between each track crossing. An oscillator produces a plurality of signals per track. The signals from the oscillator are compared to the signal from the integrator by a comparator. The output of the comparator is a series of pulses, all of which have the same frequency, but with different duty cycles. This series of pulses is used by the ROM to modulate its output such that one value of velocity is outputted when the pulse is "high" and another value of velocity is outputted when the pulse is "low". The signal from the ROM is converted to an analogue signal and is used to control the head assembly.

10 Claims, 12 Drawing Figures

VELOCITY CONTROL SYSTEM FOR A DATA STORAGE APPARATUS

BACKGROUND OF THE INVENTION

The present invention relates to an access control system, and more particularly, to a control system for controlling the velocity of a head assembly in a direct access storage device.

A number of systems now exist and are commonly used in direct access storage device, such as a rotating magnetic disc, to control the velocity of a head assembly in moving from one location to the desired final location. In general, the two criteria that must be satisfied in such a system are: (1) the system must have fast response; and (2) the system must be accurate. Since substantially all of the present day direct access storage devices are used on digital computers, the command to the system from the computer is in digital form. Yet, on the other hand, the output from such a system to the head assembly must necessarily be in analogue measures, such as currents, and volts. Thus, present control systems must also deal with the problem of the conversion of digital information to analogue information. The problems of speed and accuracy are compounded by errors in the conversion. In *IEEE Transactions on Magnetics*, July 1978, Volume 14, No. 4, page 177, R. D. Oswald discusses the problems of speed and accuracy, and in particular the problem of accurately approaching the final desired location. In that article, Oswald also proposes a solution, wherein as the head assembly approaches the final desired position, a second access control subsystem is used to more accurately control the final phase of the arrival of the head assembly to the desired position. Such a system however, requiring more components, is clearly more expensive.

SUMMARY OF THE INVENTION

In the control system of the present invention, for controlling the velocity of a head assembly in a direct access storage device, the system has counting means for generating a distance value. The distance value is an integer number representing the number of tracks between the present position of the head assembly and the final position of the head assembly. Memory means are provided for storing a plurality of velocity values. One of the values corresponds to the distance generated by the counting means, while another value corresponds to the distance value anticipated to be generated from the counting means. Pulsing means are adapted to generate a plurality of pulses, all having the same frequency and with each pulse having two states. The memory means is adapted to generate a modulated velocity signal in which one value of velocity is generated in response to one state of the pulse while another value of the velocity is generated in response to the other state of each pulse. Finally, the modulated velocity signal is converted by a digital to analogue converter means.

DETAILED DESCRIPTION OF THE DRAWINGS

Figure 1:
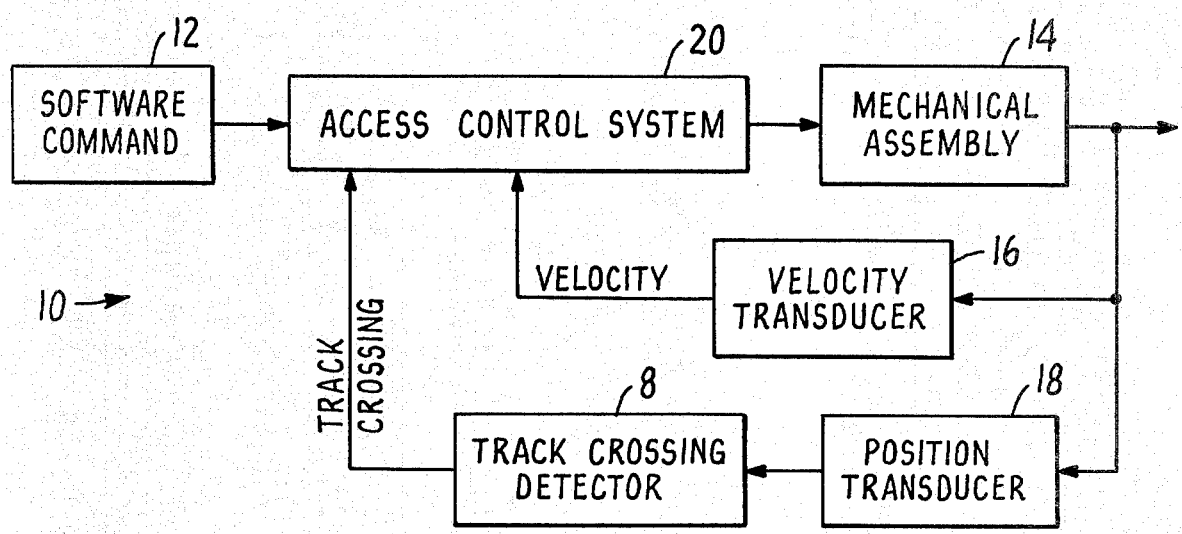
FIG. 1 is a schematic overview of the function of the access control system of the present invention in a direct access storage device.

Referring to FIG. 1 there is shown a schematic overview diagram of the function of the access control system of the present invention in a direct access storage device system. The disc system 10 comprises a software command 12 which generates a signal in digital form instructing the access control system 20 to move the mechanical head assembly 14 from its then present location to the final desired location. In addition, disc system 10 has a velocity transducer 16, a position transducer 18 and a track crossing detector 8, all of which are well known in the prior art, to assist the control system 20 in generating the necessary electrical signal command for the mechanical assembly 14. As previously indicated, the software command 12 generates a digital signal to the control system 20. The control system 20 however must generate an analogue signal to the mechanical assembly 14 to move the assembly 14. It will be appreciated that software command 12, the mechanical assembly 14, the velocity transducer 16, the position transducer 18, and the track crossing detector 8 are all well known in the art and will not be discussed hereinafter.

Figure 4A:
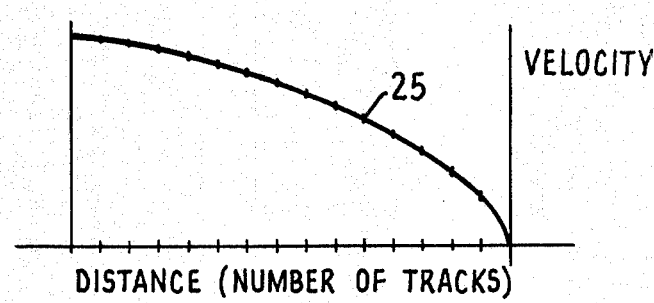
FIGS. 4(a through c) are graphs or portions thereof of velocity as a function of the distance to travel for an ideal control system (4a), the control system of the prior art (4b), and the system of the present invention (4c).

Referring to FIG. 4a, there is shown a diagram of velocity as a function of distance. Typically, in a rotating magnetic disc system, the distance is expressed in number of tracks. A track being an amount of physical distance on a rotating magnetic disc. The curve 25 shown in FIG. 4a shows that as the distance to move to the desired position decreases, the velocity also decreases. This is analogous to the following situation: to travel from point a to point b one begins by accelerating the mechanical system to the maximum control velocity. Naturally, as one approaches point b, i.e., the distance left to travel decreases, the velocity should correspondingly decrease to allow oneself to accurately reach point b. The curve 25 shown in FIG. 4a is ideal in the sense that it satisfies both the criteria of speed of response as well as accuracy.

Figure 2A:
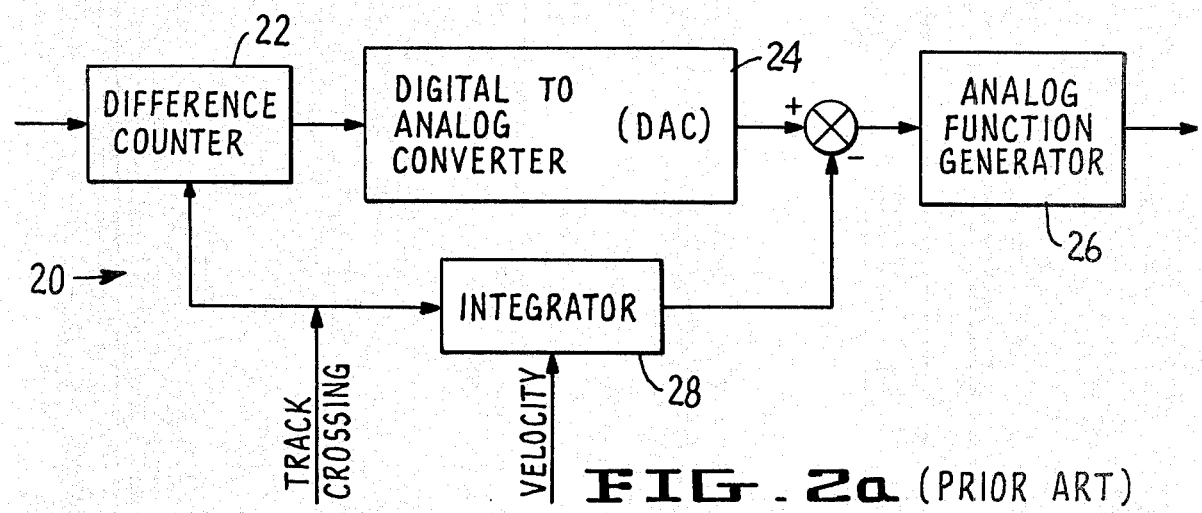
FIGS. 2(a–c) are electrical block schematic diagrams of the access control systems of the prior art.

Referring to FIG. 2a, there is shown a control system 20 of the prior art. The control system 20 comprises a difference counter 22, a digital to analogue converter (DAC) 24, an analogue function generator 26, and an integrator 28. The difference counter 22 receives the command from the software command 12 and generates a digital signal which corresponds to the number of tracks that the head assembly 14 must travel to reach the final desired track position. The difference counter 22 is decremented by the integer 1 every time the mechanical head assembly 14 crosses a track, as detected by track crossing detector 8, as shown in FIG. 1. The track crossing detector 8 sends a signal to the difference counter 22 to decrease it by 1, to indicate that there is one less track to move to the final desired position. The digital signal from the difference counter 22 is converted by the DAC 24 to an analogue signal and is representative of the discrete distance remaining to be travelled. An integrator 28 generates a continuous distance signal in proportion to the velocity of the mechanical assembly 14. This signal is reset, i.e., the signal is regenerated, each time the assembly 14 has entered into another track. Thus the track crossing signal from the track crossing detector 8 is also used to reset the integrator 28. The signal from the integrator 28 is subtracted from the signal from the DAC 24 and the subtracted signal is used by the analogue function generator 26 to generate a signal for the mechanical assembly 14.

Figure 4B:
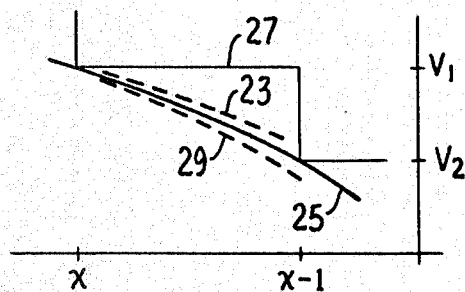

The timing of the various components of the control system 20 of the prior art may best be seen by referring to FIG. 4b. The difference counter 22 generates a series of digital signals representing the number of tracks yet left to be traversed by the head assembly 14. This signal, however, is generated only in discrete intervals, i.e., whenever the head assembly crosses a track. Thus, the difference counter 22 outputs a signal which is at a constant level until the track crossing signal has decremented the counter 22 by 1. In which case, the difference counter 22 outputs a new constant signal. The output of the counter 22 is converted to an analogue signal by the DAC 24 and inputted to the analog function generator 26. If there was no input signal from the integrator 28, the resultant signal from the function generator 26 would be curve 27. Curve 27 is a step-like function in decreasing from velocity $V_1$ to $V_2$ while the position decreases from x to (x−1). In contrast the ideal curve 25 is a smooth continuous decrease from $V_1$ to $V_2$ between x and (x−1). The function of the integrator 28 is to provide a smooth and continuous decrease from $V_1$ to $V_2$ such that by the time the track has reached position of x−1 the velocity will hopefully be at $V_2$. However, as pointed out by Oswald in his article, the use of the integrator 28 to generate the so called "fill-in" function is at best a guess. Either curve 23 or 29 may result. Curves 23 and 29 show a mismatch from desired curve 25. This mismatch occurs at high velocity as well as when approaching the final track. In fact, as shown in FIG. 5 of Oswald's article, it is entirely possible that as the head assembly 14 approaches the final track, the velocity of the assembly 14 may even reach a negative value. This would correspond to the head assembly 14 moving backwards in the direction from which it came. The inherent inaccuracy and slowness of response of the control system 20 of the prior art prompted Oswald to teach in his article the use of an additional function generator that is in operation during the final half track of the operation where accuracy is critical. This, of course, necessitates more components and increases the cost of the control system.

Figure 2B:
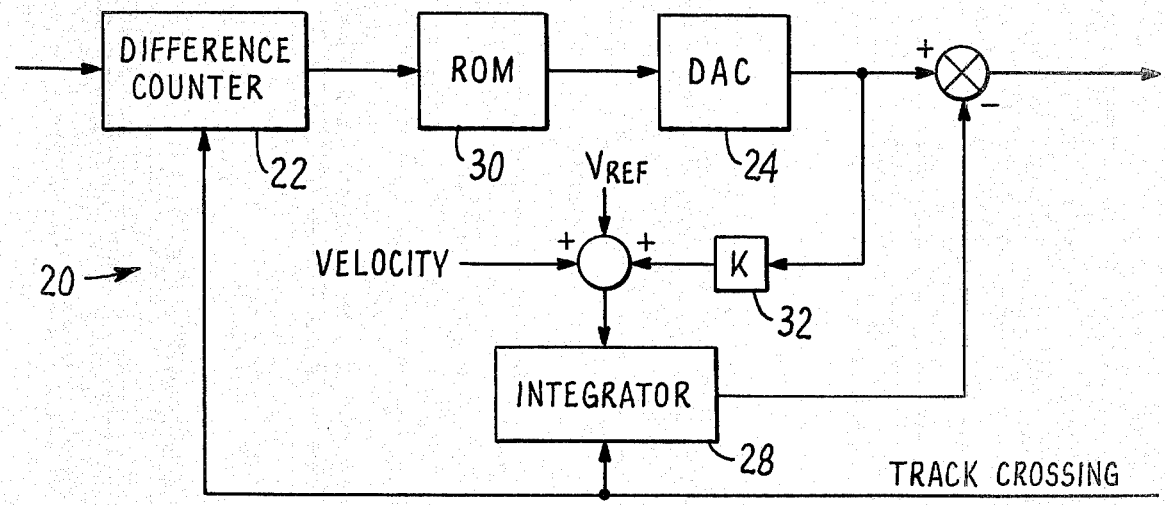
Figure 2C:
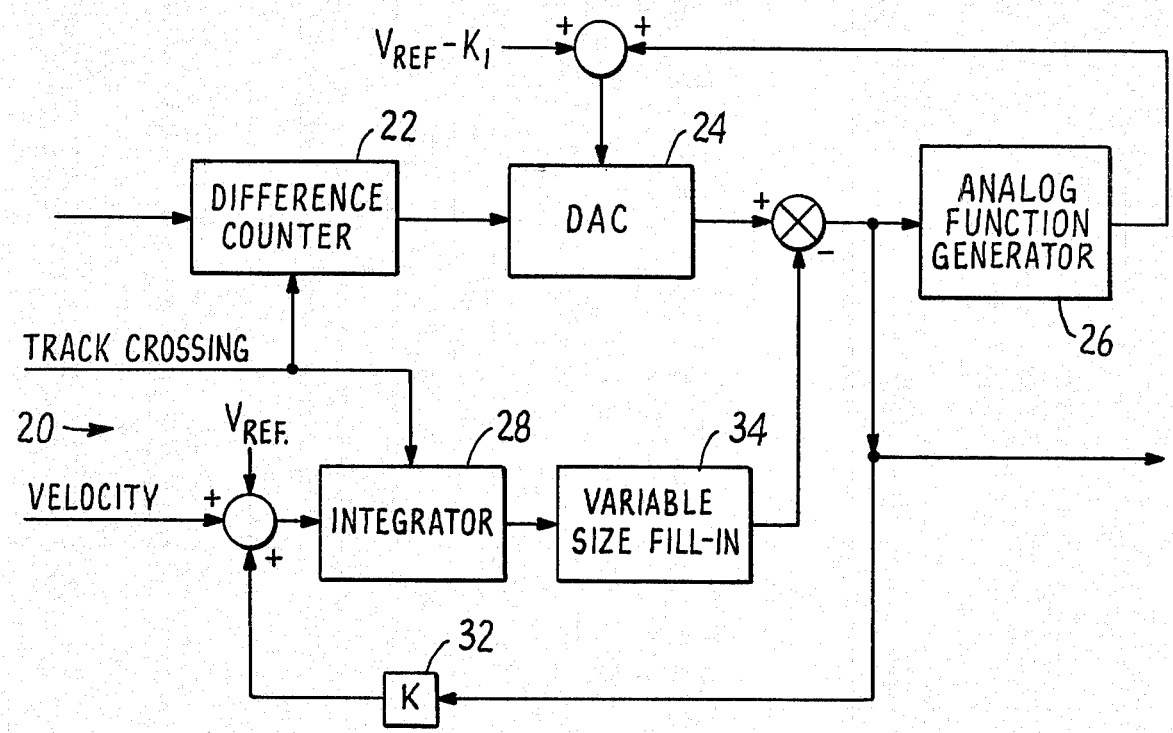

FIGS. 2(b) and 2(c) are various embodiments of other access control systems of the prior art, in commercial usage. In FIG. 2(b) the embodiment of the control system 20 uses a ROM 30 interposed between the difference counter 22 and the DAC 24. Here, the ROM 30 stores a number of velocity values as a function of the tracks remaining. Similar to the embodiment shown in FIG. 2(a), however, the signal from the integrator 28 is used to provide a smooth and continuous decrease from $V_1$ to $V_2$ such that by the time the track has reached position of X−1 the velocity would hopefully be at $V_2$. Again similar to the embodiment shown in FIG. 2(a), either curve 23 or 29 may result.

FIG. 2(c) is analogous to FIG. 2(a) and the embodiment shown therein suffers the same disadvantages.

Figure 3:
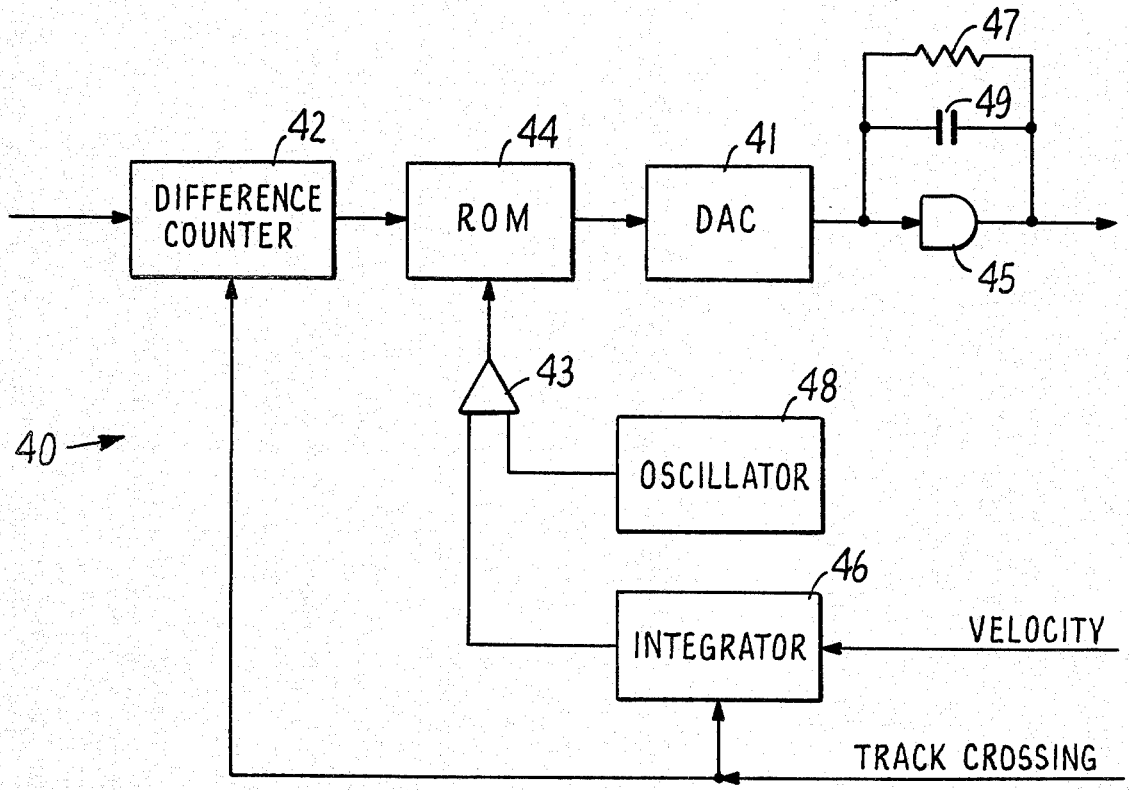
FIG. 3 is an electrical block schematic diagram of the control system of the present invention.

Referring to FIG. 3, there is shown an improved access control system 40 of the present invention. The improved system 40 comprises a difference counter 42, which generates a digital signal signifying the distance or the number of tracks to be traversed by the mechanical assembly 14. The difference counter 42 is exactly like the difference counter 22 of the prior art. Similar to the prior art, this difference counter 42 is decremented by 1 each time the head mechanical assembly 14 has crossed onto another track as signified by the track crossing pulse generated by the track crossing detector 8. From the difference counter 42 the signal is fed into a memory means 44. The memory means 44, which can comprise a ROM (read only memory) or PROM (programmable read only memory) or RAM (random access memory), has stored therein at least two values of velocity. One value of velocity is set in response to the output from the difference counter 42. Another value is in response to the anticipated output from the difference counter 42. The anticipated output from the difference counter 42 is, of course, the number of tracks left to be traversed subtracting the integer 1.

Figure 5A:
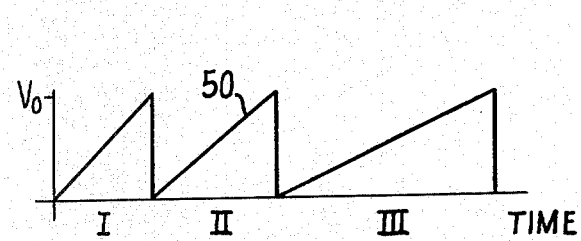
FIGS. 5(a through c) are timing diagrams of various components of the control system of the present invention.
Figure 5B:
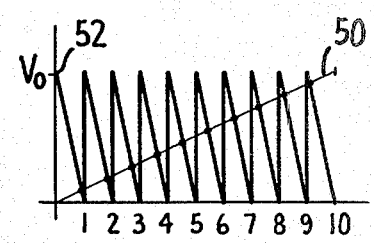
Figure 5C:
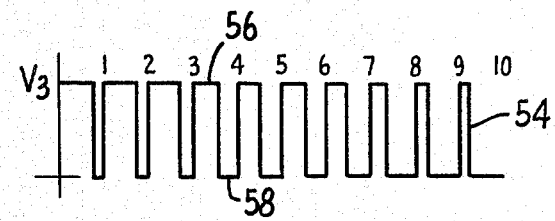

An integrator 46, similar to the integrator 28 of the prior art, generates a signal in response to the velocity of the head assembly 14, from the velocity transducer 16, and is reset by the track crossing pulse from the track crossing detector 8. The signal integrated by the integrator 46 is velocity. Therefore, the output from the integrator 46 is a position signal. The track crossing pulse from the track crossing detector 8 will reset the integrator 46 to zero, each time there is a track crossing. The output of the integrator 46 will therefore generate a position signal for only one track before being reset. Ideally, the output of the integrator 46 will reach $V_0$ at the end of each track travel, i.e. before being reset, regardless of the time required to travel the track. FIG. 5a depicts the integrator output for various velocities. For example, when the velocity is high, the frequency of the track crossing would also be very high. Therefore, the integrator 46 would reach voltage $V_0$ very quickly and would be reset very quickly. This is shown, for example, as section I of signal 50. However, as the distance to be traversed decreases and the assembly 14 is near the final desired location, the velocity also decreases. With a decrease in velocity, the time required to traverse from one track to another would also increase thereby increasing the time for the integrator 46 to reach the final voltage $V_0$. This is shown, for example, as section III of signal 50.

An oscillator 48 generates a plurality of signals all having the same frequency. Typically this frequency is at 50 KHz. The oscillator 48 generates a signal 52 that rises very quickly to $V_0$ shown in FIG. 5b and then goes back to zero all within the frequency of 50 KHz. The shape of the signal 52 from the oscillator 48 is determinative of the ultimate relationship between the distance traveled and the output from the DAC 41. A signal 52 having a linear sawtooth shape will cause a linear relationship, i.e. for 50% travel there is 50% difference between $V_1$ and $V_2$. Similarly, a signal having an exponential sawtooth shape will cause an exponential relationship. Moreover, the frequency of the signal 52 is not critical, so long as the frequency is sufficiently higher than the frequency of the signal 50 from the integrator 46, without affecting stability. A comparator 43 compares the signal 52 from the oscillator 48 and the signal 50 from the integrator 46. Thus, in FIG. 5b, the signal 52 from the oscillator 48 is superimposed on the signal 50 from the integrator 46 for one track crossing. The output of the comparator 43 is a series of digital pulses 54 all having the same frequency of 50 KHz. When the signal 52 from the oscillator 48 is greater than the signal 50 from the integrator 46, the output of the comparator 47 is "high", i.e., a state 56 having a voltage of $V_3$. When the signal 52 from the oscillator 48 is less than the signal 50 from the integrator 46, the output of the comparator 43 is "low", i.e., a state 58 with voltage of 0. For a typical one track crossing, the comparison between the signal 52 from the oscillator 48 and the signal 50 from the integrator 46 is shown as waveform 54 in FIG. 5c. Each of the ten pulses shown in FIG. 5c has the same frequency. The duty cycle, i.e., the amount of time within each pulse in which the voltage is high varies from pulse to pulse. From FIG. 5c it can be seen that at the beginning of a track, i.e. near the 1st and 2nd pulse, each pulse has a large duration of high 56 and a relatively small duration of low 58. Towards the end of the track, that is near the 9th and 10th pulses, it can be seen that each pulse has a small duration of high 56 and a large duration of low 58. The output of the comparator 43 is also entered into the ROM 44.

The comparator 43 and the oscillator 48 can be collectively referred to as a pulsing means which generates a plurality of pulses, during one track crossing, with each pulse having two states. All of the pulses have the same frequency.

Figure 4C:
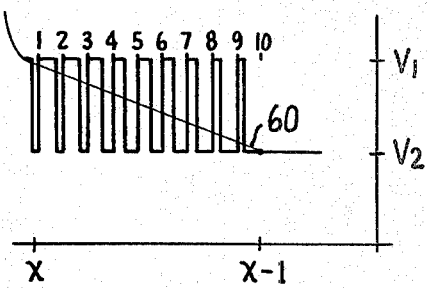

As previously stated, ROM 44 has stored at least two digital values of velocity. One value corresponding to the present distance value from the difference counter 42, another value corresponding to the anticipated distance value from the difference counter 42. In FIG. 4c, this is shown as velocity $V_1$ and velocity $V_2$, representing the velocity that corresponds to the present value of distance x and the anticipated value of distance (x−1) respectively. Based upon the output from the comparator 43, the ROM 44 outputs a signal which is a modulated signal which varies between the present value of velocity, i.e., $V_1$ and the anticipated value of velocity, that is $V_2$. The modulated signal from the ROM 44 is converted into an analogue signal by the DAC 41. DAC 41 is entirely similar to the DAC 24 of the prior art. In FIG. 4c, it is seen that the output from the DAC 41 is a velocity signal modulated by the comparator 43. When the output of the comparator 43 is high 56, the output from the DAC 41 is a velocity $V_1$. When the output from the comparator 43 is low 58, the output from the DAC 41 is a velocity $V_2$. From the DAC 41, the signal is shaped by an amplifier 45 with an RC resistive-capacitive network of resistor 47 and capacitor 49. This causes a resultant signal, as shown in FIG. 4c, to be the curve 60, which is the average DAC output.

Figure 6:
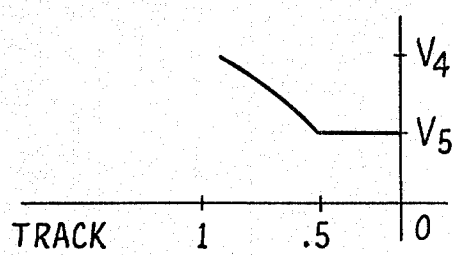
FIG. 6 is a graph of velocity as a function of the distance to travel for the final track.

In a refinement over the system 40 of the present invention, to insure absolute control over the velocity of the final track, the signal 52 from the oscillator 48 is lowered in amplitude such that the pulse width of the comparator 43 changes and the final velocity $V_5$ is reached after travelling one half of the last track. Referring to FIG. 6 there is shown the curve of velocity as a function of the distance for the control over the final track. The comparison between the signal 52 from the oscillator 48 and the signal 50 from the integrator 46 would result in a signal 54 that is always low 58 over the last one half track distance. Consequently, the output of the DAC 41 would be a pre-determined non-zero velocity command. Even though present velocity transducer 16 and integrator 46 have inaccuracies and drift, they will not cause the DAC 41 outputs to drop lower than the predetermined value.

As discussed hereinabove, the output from the integrator 46 is a position signal. Thus, the integrator 46 may be replaced by a position signal, if an accurate position signal were available.

In addition it is seen that the output from the comparator 43 may, with the addition of other circuit elements, be used to modulate directly the difference counter 42 rather than the ROM 44, directly. By modulating directly the difference counter 42, a modulated difference count signal would be produced, which in turn would cause the ROM 44 to produce a modulated velocity signal. Thus the modulated velocity signal output from the ROM 44 would be an indirect response to the output from the comparator 43.

From the foregoing it can be seen that there are a number of advantages to the control system of the present invention. First, the system is near optimum in terms of speed of response and accuracy. The velocity change from one track to another is accurate and is independent of the time traveled between the tracks. Secondly, it can be seen that the system 40 of the present invention solves Oswald's problem but without resorting to the addition of a second subsystem to control the head assembly 14 in the final phases of the approach to the desired position. Thirdly, because the ROM 44 has a stored value of the anticipated output from the difference counter 42, this value even near the final track can never be 0. Therefore, in the system 40 of the present invention, there can never be the possibility that the velocity would be negative. Finally, by changing the shape of the waveform of the oscillator 48, the shape of the velocity curve between tracks is easily changed.

What is claimed is:

1. In an access control system, for controlling the velocity of a head assembly in a direct access storage device, having difference counting means for indicating the distance to move for the assembly, memory means for storing a plurality of values of velocity, DAC conversion means for converting a digital to an analogue signal, said analogue signal for controlling the velocity of said head assembly, and an integrator means for generating a signal corresponding to movement of one track, wherein the improvement comprises:

pulsing means for generating a plurality of pulses, during the time for said assembly to move across one track, all of said pulses having the same frequency with each pulse having two states;

said memory means responsive to the output from the difference counting means for generating a modulated velocity signal, said modulated velocity signal being further responsive to each pulse;

said modulated velocity signal being one value of velocity in response to one state of each pulse and said modulated velocity being another value of velocity in response to the other state of each pulse; and said modulated velocity signal being supplied to said DAC conversion means.

2. The control system of claim 1 wherein said pulsing means further comprises:

oscillating means for generating a plurality of signals all having the same frequency; and comparator means for generating a plurality of pulses in response to the comparison between the signals of said oscillating means and the signal from said integrator means.

3. A velocity control system, for controlling the velocity of a head assembly in a disc drive in moving from one position of said head assembly to a desired position, said system comprising:
- counting means for generating a distance value, said distance value being an integer number, representing the number of tracks between said one position and said desired position;
- memory means for storing a plurality of velocity values, a first velocity value corresponding to said distance value, a second velocity value corresponding to an integer number obtained by subtracting an integer of one from said distance value;
- integrator means for producing a signal corresponding to the movement of said assembly across one track;
- oscillating means for generating a plurality of signals, all having the same frequency;
- comparator means for comparing each of said plurality of signals from said oscillating means to the signal from said integrator means and for producing a plurality of pulses, with each pulse having two states;
- said memory means for generating a modulated velocity signal in response to each pulse, said modulated velocity signal being said first velocity value in response to one state of each pulse, and said modulated velocity signal being said second velocity value in response to the other state of each pulse; and
- digital to analogue conversion means for converting said modulated velocity signal to an analogue signal, whereby said analogue signal being used to control the velocity of said head assembly.

4. The system of claim 2 or 3 wherein said memory means is directly responsive to the pulses from said comparator means.

5. The system of claim 4 wherein said analogue signal is further shaped by filtering means.

6. The system of claim 4 wherein said system further comprises track crossing detecting means for resetting said integrator means and for counting down said counting means.

7. The system of claim 4 wherein said frequency is approximately 50 KHz.

8. The system of claim 7 wherein said memory means is a ROM.

9. The system of claim 7 wherein said memory means is a PROM.

10. The system of claim 7 wherein said memory means is a RAM.

* * * * *